Oct. 16, 1928.
R. V. MATTISON
CEMENT PRODUCT
Filed Oct. 1, 1924
1,687,681
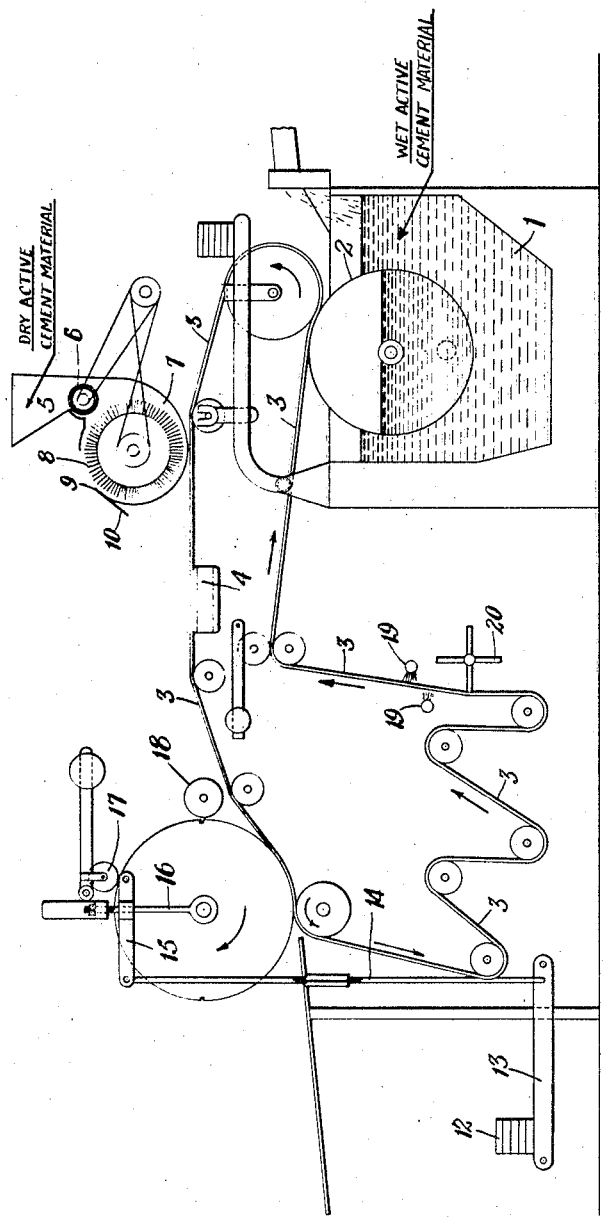
INVENTOR
Richard V. Mattison
BY
Edwards, Sager & Bower
ATTORNEYS Patented Oct. 16, 1928.

1,687,681

UNITED STATES PATENT OFFICE.

RICHARD V. MATTISON, OF AMBLER, PENNSYLVANIA, ASSIGNOR TO ASBESTOS SHINGLE, SLATE & SHEATHING COMPANY, A CORPORATION OF PENNSYLVANIA.

CEMENT PRODUCT.

Application filed October 1, 1924. Serial No. 740,971.

This invention relates to cement products and methods of producing them, particular reference being had to cement products formed of cement and fibrous material such as asbestos set in the cement.

One method of producing cement material of this kind is to build it up of a plurality of layers or films colloided by water, the assembled layers being pressed together and allowed to set.

The object of this invention is to provide such cement material of great strength and hardness and at a reduced cost of production.

In the accompanying drawings I have illustrated in diagram a machine upon which my process can be carried out.

I first mix the hydraulic cement, asbestos fibre and water in a beating engine in the usual manner, retaining, or even exceeding, the usual proportions of hydraulic cement and asbestos, until the cement is thoroughly "colloided", or rendered sticky and gluelike, and entangled with the fibrous material. An example of proportions is 85% by weight of hydraulic cement and 15% of asbestos fibre. The mixture is then flowed into a vat 1, in which revolves a screen roller 2 which in revolving picks up and deposits upon the endless felt belt 3 a film of the wet hydraulic cement and asbestos fibre.

A suction box 4 may be used to remove as much as desired of the surplus water from a mixture.

In usual practice the film on the belt 3 is rolled up and accumulated in successive layers on the cylinder 11.

I have discovered that a superior product at reduced cost may be produced by introducing between the successive layers of the film material thus built up, active hydraulic cement in dry powdered form.

This cement material, which may contain fibers or other inert material such as silica mixed in with it, is placed in a hopper 5. A wire covered roller 6 feeds the dry mixture to the lower hopper 7 where it is picked up by a revolving brush 8, from which it is scraped by a scraper 9, and passing over the apron 10 the dry powdered material falls and sprinkles evenly upon the film of wet material on the belt. Various proportions of the dry material with respect to the wet material may be used according to conditions.

There is enough water in the film on the belt 3 to furnish for this sprinkled dry cement asbestos and silica sufficient water to provide for all the hydration and colloiding necessary. The film of combined material passes under the cylinder 11, where it is transferred to the surface of the latter and winds up thereon in layers. When the layers build up to the desired thickness the sheet is removed from the cylinder and subjected to hydraulic pressure and the cement allowed to set. Sufficient pressure to form the sheet is imparted to the cylinder 11 by its weight and by the weight 12 acting through the lever 13, connecting rod 14, lever 15 and bearing rod 16. Other rolls 17 and 18 may be employed to aid in maintaining the shape of the sheet before it has been subjected to the final high pressure. The belt is cleaned by sprayers 19 and beater 20.

The resulting product combines layers of film cement worked up in a large excess of water with intermediate layers of cement wetted with enough water to be thoroughly hydrated. The combined qualities of the successive layers gives a product of increased hardness and strength. The dry cement layer is fed with water from the wet film on each side and a strong firm bond between all of the layers is formed by the rolling and pressing operations so that the assembled and pressed layers set as an integral mass. At the same time the cost of production is reduced as it is simpler and cheaper to sprinkle the cement material in dry form than to mix it up with water and lift a film of the wet mixture.

I claim:

1. A cement product comprising a plurality of film-like layers of hydraulic cement-like material hydrated by mixing with an excess of water and a plurality of intermediate film-like layers of hydraulic cement material between said first named layers and hydrated by water received from said first named layers on each side of the cement material, the whole being pressed and permitted to set together so as to bind the entire series of layers into an integral, rigid mass.

2. A cement product comprising a plurality of film-like layers of hydraulic cement-like material hydrated by mixing with an excess of water and a plurality of intermediate film-like layers of hydraulic cement material applied in a dry state between said first named layers and hydrated by water received from said first named layers on each side of the cement material, the whole being pressed and permitted to set together so as to bind the entire series of layers into an integral mass.

3. The process which consists in first working up hydraulic cement, fibrous material and water until the cement has become sticky and entangled with fibre, then forming the wet mixture in a sheet, then sprinkling the sheet with finely divided active cement material, then subjecting the mixture to pressure, and then allowing the hydraulic cement to set.

4. The process which consists in first working up hydraulic cement, fibrous material and water until the cement has become sticky and entangled with fibre, then forming the wet mixture in a sheet, then sprinkling the sheet with finely divided active cement material mixed with finely divided inert material, then subjecting the mixture to pressure, and then allowing the hydraulic cement to set.

5. The process which consists in first working up hydraulic cement, fibrous material and water until the cement has become sticky and entangled with fibre, then forming the wet mixture in a sheet, then sprinkling the sheet with finely divided material comprising finely divided active hydraulic cement, fibrous material and inert material, then subjecting the mixture to pressure, and then allowing the hydraulic cement to set.

6. The process which consists in first working up hydraulic cement with an excess of water until the cement has become sticky, forming a wet mixture into a thin sheet, sprinkling the sheet while wet with finely divided active cement material and thereafter subjecting the whole to pressure before the hydraulic cement sets and thereafter allowing the hydraulic cement to set.

RICHARD V. MATTISON.